C. H. DAVIS.

BOX-LOOPS FOR CARRIAGE-TOPS.

No. 6,974. Reissued March 7, 1876.

Witnesses:

J. F. Gremoyt

Peter B. McLennan

Inventor:

Charles H. Davis.

N. PETERS, PHOTO-LITHOGRAPHER, WASHINGTON, D. C.

UNITED STATES PATENT OFFICE.

CHARLES H. DAVIS, OF SYRACUSE, NEW YORK.

IMPROVEMENT IN BOX-LOOPS FOR CARRIAGE-TOPS.

Specification forming part of Letters Patent No. 95,004, dated September 21, 1869; reissue No. 6,974, dated March 7, 1876; application filed December 14, 1874.

*To all whom it may concern:*

Be it known that I, CHARLES H. DAVIS, of Syracuse, New York, have invented a new and Improved Box-Loop for use on Carriage-Tops and the like, of which the following is a specification:

My invention has for its object an improvement in the construction of box-loops for carriage-tops, trimmings, &c. It consists in forming the loops in metal, either cast or struck up into form from a single piece of plate or sheet metal, with a series of spurs or lugs projecting from the edges or corners next the surface to which they are to be affixed, which spurs or lugs pass through the carriage-top or curtain, and are clinched down tight upon it, and I introduce a metal plate on the opposite side of the leather as a stiffening-plate, through which the spurs pass before they are clinched, as a further security in the fastening, by which form and construction I securely affix the box-loop to the curtain, &c., without the employment of rivets or screws.

Box-loops, as usually constructed, are made of leather, and either sewed or riveted in place. They are liable to be bent out of shape and torn from their fastenings; and this mode of construction and application is slow and expensive, requiring the labor of skilled workmen, while, by my improvement, the box-loop can be easily applied by any one, and is not liable to get out of order.

Figure 1:
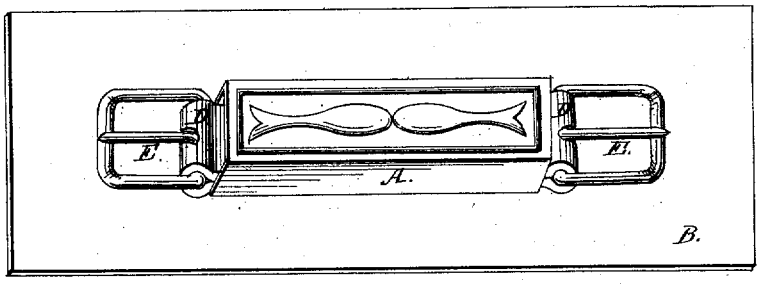
Figure 2:
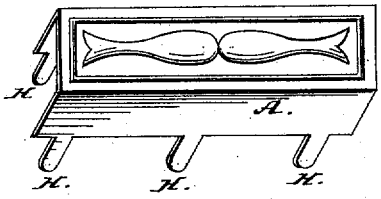
Figure 3:
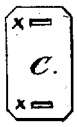
Figure 4:
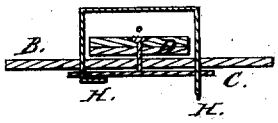

In the accompanying drawings, which form a part of this description, Figure 1 is a perspective view of the loop, either cast or struck up from thin metal, affixed in place with buckles complete. Fig. 2 is a perspective view of the loop detached. Fig. 3 is the stiffening-plate C.

A is a metal loop, either cast or struck up from thin metal, preferably the latter, which are cut out by suitable dies, with lugs or spurs formed at H H upon the two sides. The loop is then bent into form and stamped or embossed, as in Figs. 1, 2, or otherwise, which completes the manufacture of the loop, which is then ready to be affixed in its place B, Fig. 1. To apply this loop to a carriage-top, or elsewhere, the spurs or lugs H H H are thrust through holes or slits made therefor in the leather, and the ends are bent and clinched down upon the other side. Buckles may be affixed to their place on B, as in Fig. 1, in any convenient way, and the loop put over them and affixed to B, as an additional security plates, C, (see Fig. 3,) are employed on the opposite side of the curtain to stiffen and support the fastenings or spurs H, which are clinched down on them after passing through openings therein for the purpose.

Having thus fully described my invention of metal loops for carriage-tops, &c., I claim—

The box loop A, formed out of thin plate metal, as described, with the lugs or spurs H projecting therefrom to affix it to a carriage-top, either with or without the plate C, substantially as and for the purposes specified.

CHARLES H. DAVIS.

Witnesses:

J. J. GREENOUGH,

PETER B. MCLENNAN.